Feb. 8, 1938.  F. E. BOEHM  2,107,851
COLORING OF BUTTER SUBSTITUTE
Filed June 29, 1936
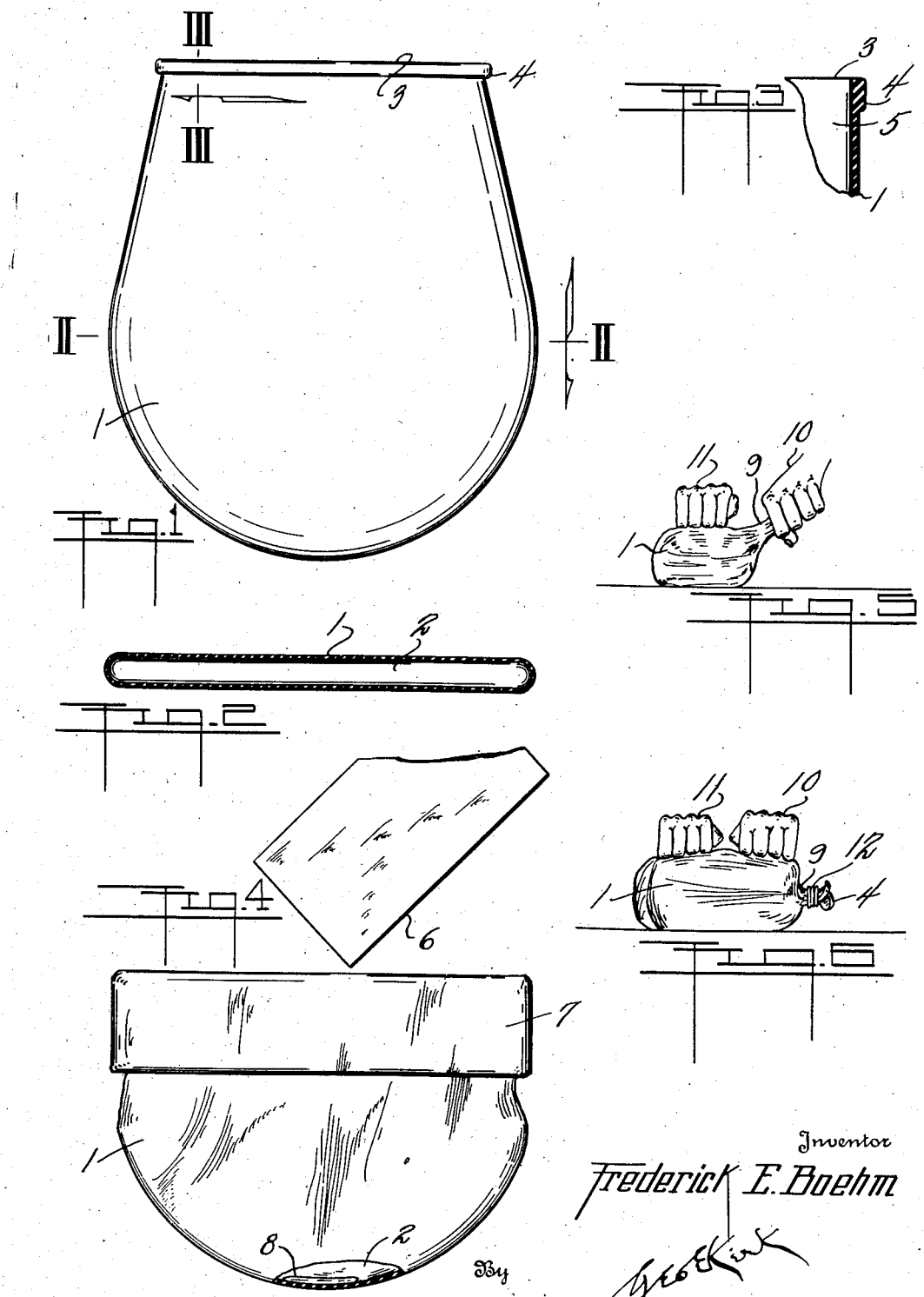
Inventor
Frederick E. Boehm
By
Attorney Patented Feb. 8, 1938

2,107,851

UNITED STATES PATENT OFFICE 2,107,851

COLORING OF BUTTER SUBSTITUTE

Frederick E. Boehm, Toledo, Ohio

Application June 29, 1936, Serial No. 87,964

1 Claim. (Cl. 99—148)

This invention relates to re-working material, especially for mixing, as to change the appearance or taste of a food product.

This invention has utility when adopted for re-working of butter, or spread substitute for butter as oleomargarine to improve the butter-like color or milk with control against oily tendencies, while of form-holding appearance properties normal for good butter as produced from cow's milk.

Referring to the drawing:

Fig. 1 is a side elevation of an embodiment of the re-worker pocket;

Fig. 2 is a section on the line II—II, Fig. 1;

Fig. 3 is a section on the line III—III, Fig. 1;

Fig. 4 is a fragmentary view of a stage or step in the re-worker operation of the device, say as receiving a block of uncolored oleomargarine to be colored therein;

Fig. 5 is a view of one-hand mixing set-up in the rolling pressing operation; and Fig. 6 is a view of a two-hand set-up for rolling pressing operation.

Container or pocket is shown as having body 1 providing main chamber 2, open side 3, bounded by marginal reinforcing rim 4, with throat 5 therefrom toward the chamber portion 2. There is thus provided an open side 3 for this chamber. The material is desirably soft, flexible and of rubber-like, elastic properties, resistant to attack or imparting odor to a charge 6 of substitute to be inserted through the opening 3 as such opening is shortened toward the chamber 2 by roll 7 of this rim along the throat 5.

At this introduction of the spreadable solid to be re-worked, item to be mixed therewith as butter coloring 8 may be added either before or after the solid is introduced. With the solid introduced into the pocket or chamber 2, the throat, as section 7, may be unrolled back to have collapsed throat 9 grasped by hand 10 of the operator, while companion hand 11 may as to the knuckles, palm, or other portion, be pressed, or desirably rolling press away from the throat 9 in re-shaping and re-forming the body 6 of this spreadable material. In the instance the user may wish to use both hands, the collapsed throat 9 may be bound by rubber band 12 wrapped thereabout.

The collapsed throat 9, while it merges toward keeping out outside air, does not prevent the expelling of surplus air therethrough in the working operation, but it is effective against the spread material of solid 6 exuding therefrom. However, this exuding action is more nicely avoided by directing the rolling pressing action away from the throat 9 and pushing into the pocket during this rolling.

As in the instance of oleomargarine, such may be taken at a chill approaching freezing. This rather brittle condition for the spread substance is one requiring much more strenuous attention at the re-working. There is not a great amount of heat conductivity from the hand of the operator. It is more an action of friction and pressure, but with such a chilled portion upon which to start, manipulated only by one hand, it would require approximately three minutes time for effective thorough mixing. However, if the spread material temperature be more nearly around 50° to 55° F., it is not so brittle and may readily take up either liquid or powder coloring, so that this re-working can be effected within one-half minute. There seems to be a holding of some of the air into the body for taste advantage of entrained air therewith on the resulting product.

Furthermore, as against attempt to introduce the color by working into the quantity or body by a fork or spoon, even with such fork or spoon operation resulting in an unstreaked or unspotted product, the result of this pocket operation hereunder not only is without streaks and without spots, but with a yellowish color more nearly approaching milk or true butter appearance. This condition is one effected without melting or bringing about an oily appearance in the product due to the temperature rise, but is in the production of the mass as a solid spreadable with wholesome attributes of appearance and taste improved beyond normal butter color response by the fork or spoon method. This mixing, described as for color ingredient, may extend to other products or even to other spreads, whether or not a food product.

As the manipulation has been effective, the charging operation is reversed. That is, the opening 3 is, as to the rim 4, rolled back on the chamber 2 of the body and the solid expelled therefrom as a mass unit having attributes even against sticking under certain temperatures of operation in which it holds its unity. As the container has been used, it is desirable to rinse such and keep it sanitary against collecting odors especially for food products.

What is claimed and it is desired to secure by Letters Patent is:

The method of re-working into a butter substitute homogeneous spreadable solid with air comprising introducing a pre-molded body of the solid with a color ingredient and air into a flexible walled container for reception of said body in the form as introduced thereinto with enveloping air thereabout; working the solid away from such form by pressing and rolling action on the container walls in a direction away from the container opening in re-forming and re-shaping the solid; with simultaneous expelling of excess air from the container and thereafter expelling the re-worked, re-formed solid in the re-formed, press-effected shape given to it in the container.

FREDERICK E. BOEHM.